Figure 1:
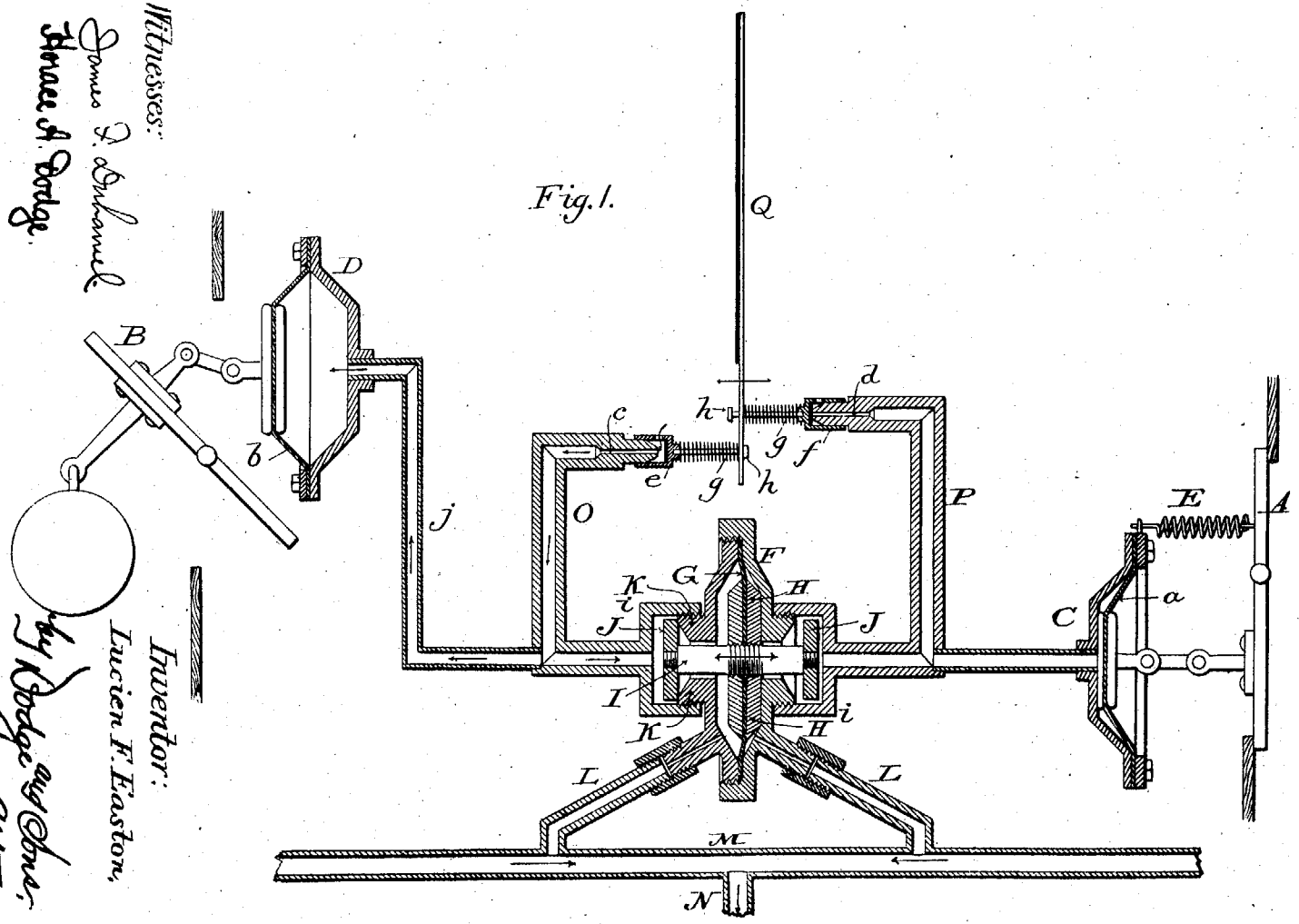

2 Sheets—Sheet 1.

L. F. EASTON.

TEMPERATURE REGULATOR.

No. 11,148. Reissued Mar. 3, 1891.

Witnesses:
James F. Duhamel
Horace A. Dodge.

Inventor:
Lucien F. Easton,
by Dodge and Sons,
Attys.

2 Sheets—Sheet 2.
L. F. EASTON.
TEMPERATURE REGULATOR.
No. 11,148. Reissued Mar. 3, 1891.
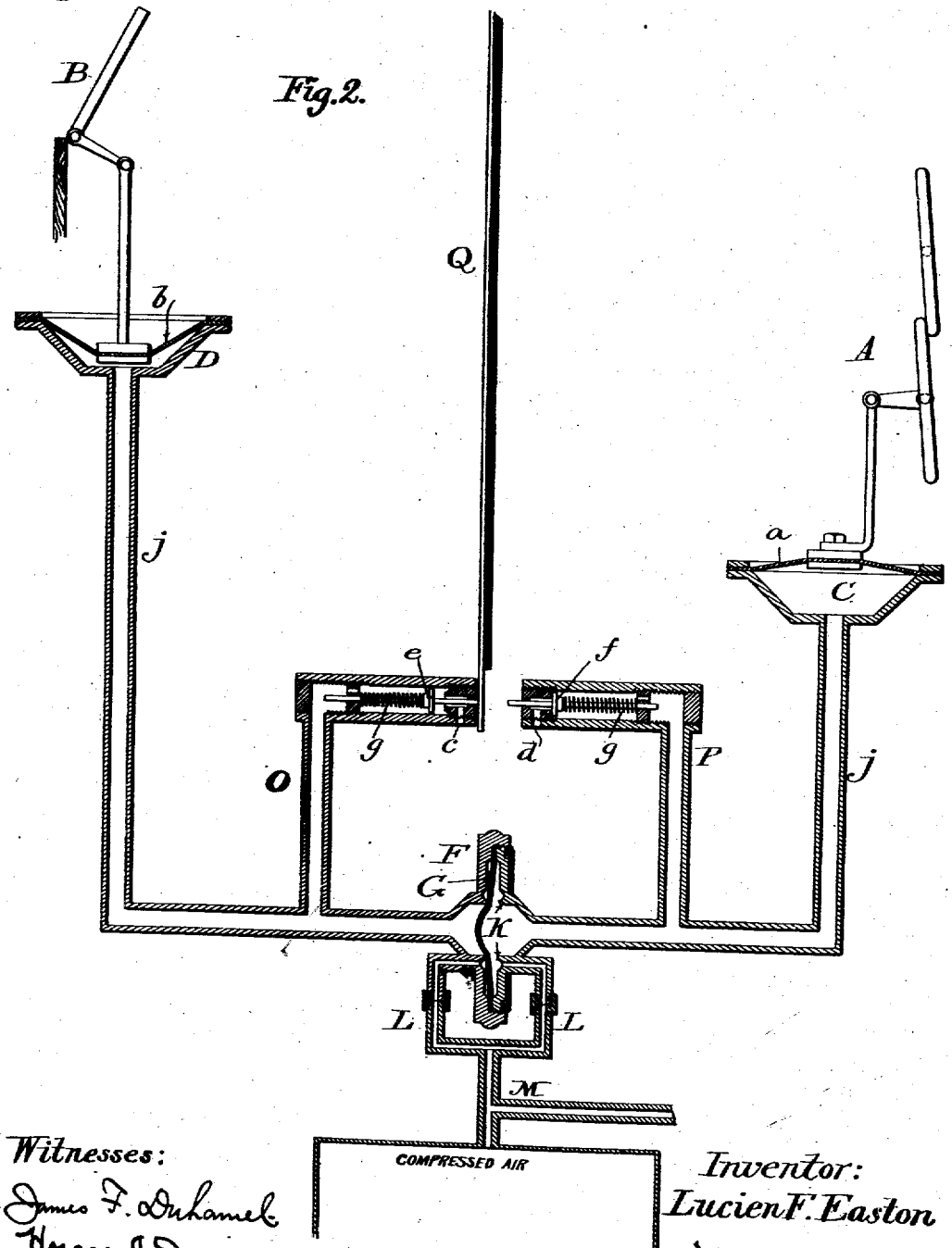
Witnesses:
James F. Duhamel
Horace A. Dodge.
Inventor:
Lucien F. Easton
by Dodge and Sons,
Attys.

UNITED STATES PATENT OFFICE.

LUCIEN F. EASTON, OF LA CROSSE, WISCONSIN.

TEMPERATURE-REGULATOR.

SPECIFICATION forming part of Reissued Letters Patent No. 11,148, dated March 3, 1891.

Original No. 432,866, dated July 22, 1890. Application for reissue filed January 13, 1891. Serial No. 377,667.

*To all whom it may concern:*

Be it known that I, LUCIEN F. EASTON, a citizen of the United States, residing at La Crosse, in the county of La Crosse and State of Wisconsin, have invented certain new and useful Improvements in Temperature-Regulators, of which the following is a specification.

My invention relates to apparatus for regulating or controlling the temperature of apartments automatically; and it consists in apparatus hereinafter described designed to be operated either by compression or exhaustion, as may be found desirable, the principle being the same in both cases.

In the accompanying drawings, Figure 1 is a sectional view illustrating my apparatus arranged to act by suction, and Fig. 2 a similar view of the same arranged to act by pressure.

Referring to Fig. 1, A indicates a register for the admission of warm air, and B a valve for the admission of cold air into an apartment, these devices A and B being merely representative forms of controlling devices for regulating the supply of warm and cold air. C indicates a chamber provided with a movable wall or piston *a*, which latter is connected in any convenient manner with the valve or valves of the register A, so that upon the movement of the flexible diaphragm or piston *a* in one or the other direction the valve or valves shall be opened or closed, as required. D represents a similar chamber, also provided with a flexible diaphragm or piston *b*, which is connected in any convenient manner with the valve B, so as to open or close the same, according to the direction in which the diaphragm or piston *b* is moved. The valve or valves of the register A will be arranged to open through the action of a spring, weight, or equivalent device, (indicated by the letter E,) and the valve B will be so hung as to open by gravity, or will be provided with an opening spring, weight, or equivalent device, as may be found expedient. The chambers C and D both communicate with a chamber F by means of suitable pipes, said chamber F containing a central flexible diaphragm G, provided on its faces with circular disks H, through which passes a central stem I, carrying at its ends disks J J, which are arranged to seat alternately against tubular necks K of the chamber F and to close communication with the interior of the chamber at that side against which the disk J at the time bears. From the interior of the chamber F and on each side of the diaphragm G a pipe L communicates with a common service-pipe M, which by a branch N communicates with an exhaust vessel or chamber or with suitable exhausting apparatus, like communication being made with the service-pipe M from each apartment in which the temperature is to be regulated, each of said apartments being provided with the apparatus herein described. Communicating with the chamber F and chambers C and D are pipes O and P, provided, respectively, with air-inlets *c* and *d*, controlled by caps or valves *e* and *f* of the form shown in Fig. 1 or an equivalent form. Q indicates the compound bar of a thermostat, composed of hard rubber and brass or equivalent materials having different degrees of expansibility under variations of temperature. As is well understood, such a compound bar bends toward the metallic side upon an increase and toward the hard-rubber side upon a decrease of temperature. From each of the caps or valves *e* and *f* a rod or stem *h* extends to and through the end of the thermostat-bar Q, where it is headed to prevent the bar from moving off the end of the rod, the stems being of such length as to permit a limited movement of the bar Q from its medial position without acting upon the head of either rod. Between the bar Q and the caps *e* and *f* each valve rod or stem is encircled by a light spiral spring *g*, which serves to transmit motion from the bar to the cap or valve in one direction and to allow for the movement of the bar after the valve is seated upon the mouth of the air-inlet *c* or *d*, thereby preventing injury to the parts and insuring accurate seating of the valves. The springs *g* also serve to hold the valves normally to their seats and to retain them in such position until the bar Q acts upon the head of the rod or valve to be opened. The pipes O and P are formed with enlargements *i*, which screw upon the necks K and form chambers, within which the disks J move under the play of the diaphragm G. The disks J are enough smaller than the interior of the chambers *i* to permit the passage of air around them into chamber F, and as a matter of convenience the pipes *j*, which connect the chambers C and D with the chamber F, are tapped into the pipes O and P, as indicated. This arrangement, however, is not essential. Under normal conditions the diaphragm G will occupy a medial position between the walls of the chamber F, leaving communication open from both the chambers *c* and *d* to the chamber F and by way of said chamber and pipes L to the service-pipe M. The valves *e* and *f* will also under normal conditions be closed, so that air may not enter through the air-inlets *c* and *d* and pass by pipes O and P to the chamber F, and thence to the service-pipe M and by it to the exhaust chamber or apparatus. Under these conditions both of the valves A and B will be closed by the action of the vacuum. If, however, the temperature falls, the thermostat Q will bend over and open the air-inlet *d*. This allows the external air to destroy the vacuum in chamber C and the spring E to pull open the valve or damper A. The atmospheric pressure on the right side of the diaphragm G will force the diaphragm to the left, carrying with it and seating the right-hand valve-disk J. This prevents the destruction of the vacuum in the main M. The admission of heat to the apartment through the register A will then tend to raise the temperature and cause the thermostat Q to bend to the right. Such bending first closes the air-outlet *d* and then opens the air-inlet *c*. This causes a destruction of the vacuum in the chamber D and a consequent opening of the ventilator B. The atmospheric pressure on the left-hand side of the diaphragm G will force the diaphragm to the right, carrying with it and seating the left-hand disk J, and unseating the right-hand disk J. This will allow the vacuum in the pipe M to exhaust the air from the chamber C, and the consequent collapse of the diaphragm *a* will close the hot-air valve A. The position will then be as shown in Fig. 1.

Referring now to Fig. 2, the use of pressure instead of vacuum will be explained, like letters representing like parts in the two structures as far as practicable. A indicates a register for the admission of warm air; B, a ventilator or cold-air inlet; C, a chamber provided with a flexible diaphragm *a*, connected with the valves of the register A in such manner as that upon the admission of compressed air to the chamber C the register shall be closed; D, a similar chamber provided with a flexible diaphragm or piston *b*, connected with the cold-air-inlet valve B in such manner that upon the admission of compressed air to the chamber D the ventilator B shall be closed, and Q the compound bar by which the action of the apparatus is controlled. F indicates a chamber containing a central flexible diaphragm G, which is arranged to seat alternately against annular seats K on opposite sides of the chamber, and L L indicate pipes connecting by a common service-pipe M with a compressed-air reservoir or compression apparatus, as indicated, communication being similarly established with like apparatus in the other apartments in which the temperature is to be controlled. The pipes O and P are provided with air-vents *c* and *d*, respectively, controlled by valves *e* and *f*, as shown. Each valve *e* and *f* is provided with a stem encircled by a light-closing spring *g*, by which it is normally pressed to its seat, the stem of each valve protruding through the closing plug or end of the pipe O or P in which it is placed and extending outward in such position to be acted upon by the moving end of the compound bar Q. Under this construction and arrangement of parts it follows that so long as the bar Q is in its normal position and out of contact with the stems of both valves *e* and *f* the compressed air from the reservoir or the compressing apparatus will be free to pass into chamber F on both sides of the diaphragm G, and being unable to escape through either vent *c* or *d* will pass into the chambers C and D and press outward the flexible diaphragm or pistons and close the warm and cold air inlets. Assuming, however, that the temperature rises above the prescribed limit, the bar Q, moving in consequence toward the metallic side, will press back the stem of valve *e* and open the vent *c*, thereby permitting air to escape through said vent from pipes O and *j* and chamber D, thereby permitting the diaphragm or piston *b* to fall and allowing the valve of the cold-air inlet B to open, the air being thus permitted to escape from the system of pipes and chambers at the left of the diaphragm G, but the system at the right-hand side thereof being sealed and containing a body of air under pressure the diaphragm G will immediately move over to and seat upon the annular bearing or seat K at its left, thereby closing communication between the compressed-air chamber or the compression apparatus and the system at the left of the diaphragm and preventing of waste of compressed air. This condition will continue until the temperature is sufficiently lowered and the bar Q resumes its normal medial position, permitting the valve *e* to close the vent *c*. When through the opening of the ventilator B, just explained, the temperature falls below the prescribed limit, the bar Q will move toward the rubber side until it bears against and forces back the stem of valve *f*, thereby opening the vent *d* and permitting the escape of the compressed air contained in chamber C, pipe *j*, and pipe P and permitting the diaphragm or piston *a* to fall and to open or permit the opening of the register A or other valve or damper regulating the admission of warm air. At the same time, owing to the relief of pressure at the right-hand side of the diaphragm G, said diaphragm will, under the influence of the compressed air from the chamber or compression apparatus, be forced over against its seat at the right-hand side of the chamber F, thereby preventing the escape or waste of compressed air at the right-hand side of the diaphragm, the compressed air passing upward on the left-hand side of the diaphragm through pipe *j* to chamber D and closing the valve of the cold-air inlet B. The parts will remain in the position last indicated until the temperature is restored to the predetermined degree and the bar Q resumes its normal medial position, and thus the parts will act alternately to admit warm or cold air, as conditions require.

Although both in Figs. 1 and 2 a ventilator as well as hot-air register is shown, it is not necessary to the operation of the device, and I do not confine myself to the use of both. In ordinary house-heating practice but one valve or damper is preferably operated, while in a store-room a ventilator alone might be desirable.

It will be apparent that those ports which serve as inlets when the apparatus acts by vacuum or suction will serve as outlets when operating with pressure, and that those ports which serve as outlets when operating with vacuum will serve as inlets when operating with pressure; or, in other words, that inlet-ports become outlet-ports and outlet-ports become inlet-ports in changing from either plan to the other.

Having thus described my invention, what I claim is—

1. In a temperature-regulating apparatus, the combination of a fluid-main common to two or more apartments and communicating with apparatus for varying the pressure within the main, a chamber containing a central diaphragm or piston and communicating on opposite sides of said diaphragm or piston with said main, two chambers, each containing a movable diaphragm or piston and respectively communicating with opposite sides of the first-mentioned chamber, a warm-air valve or damper connected with the piston or diaphragm of one of said chambers, a cold-air valve or damper connected with the piston or diaphragm of the other of said chambers, air-inlets communicating with said chambers, respectively, air-vents communicating with said chambers, respectively, and a thermostat arranged, substantially as set forth, to act upon said valves and to open or close them alternately as the temperature rises above or falls below the prescribed limits.

2. A temperature-regulator consisting of the following elements: a service-main communicating with a pumping apparatus for producing pressure or suction as required, a chamber containing a central diaphragm or piston, passages opening from opposite sides of the piston or diaphragm into the main, valves or disks carried by the central diaphragm or piston and serving to open one and close the other side of the chamber alternately, a second chamber containing a flexible diaphragm or partition, a cold-air valve or damper connected with and movable by the diaphragm or partition of said second chamber, a third chamber, also provided with a flexible diaphragm or partition, a warm-air valve or damper connected with and controlled by said diaphragm or partition, two air-vents, each communicating with one side of the first chamber and with the second or the third chamber, valves controlling said vents, and a thermostat arranged and operated, substantially as set forth, to actuate said valves alternately and to open one or the other, according to variations in the temperature of the apartment in which the thermostat is located.

3. In a temperature-regulating apparatus, the combination of a fluid-main M, a chamber F, provided with a central diaphragm or piston G, pipes L L, connecting opposite sides of said chamber with the main M, stem I, carried by the piston or diaphragm G and provided with disks or valves J, pipes O and P, provided, respectively, with vents *c* and *d*, valves *e* and *f*, applied to said vents, chambers C and D, provided, respectively, with diaphragms or pistons *a* and *b*, cold-air valve B, connected with the piston or diaphragm *b*, warm-air valve A, connected with the piston *a*, and thermostat Q, arranged, substantially as shown and described, to actuate the valves *e* and *f*.

4. In a temperature-regulator, the combination, with a hot-air valve or regulator and a cold-air valve or regulator, of movable diaphragms or pistons for actuating the same, a service-main, an intermediate chamber containing a central diaphragm or piston, air-vents arranged one to admit air to one side of the intermediate chamber and to the piston controlling the cold-air valve, the other to admit air to the other side of the intermediate chamber and to the piston of the warm-air valve, valves controlling said vents, and a thermostat adapted to actuate said valves alternately as the temperature rises above or falls below the predetermined point.

5. In a temperature-regulator such as set forth, an air-vent *c*, a valve *e*, provided with a stem *h*, a spring *g*, encircling said stem and serving normally to seat the valve and close the vent, and a thermostatic bar Q, arranged to act upon said stem and to open the valve when the bar moves in the proper direction.

6. In a temperature-regulator, the combination of a chamber, a movable partition within said chamber, four ports, two on each side of said partition, one port on each side communicating with the atmosphere and the other with a main or reservoir, two valves, one on each side of and operated by the partition to control the passage of fluid through the chamber, a thermally-controlled valve applied to each of the ports communicating with the atmosphere, an expansible and contractible chamber communicating with one of the ports opening to the atmosphere at a point between the thermal valve and the partition-actuated valve, and a damper, valve, or like device connected with a movable part of the expansible and contractible chamber.

7. In a temperature-regulator, the combination of a chamber, a movable partition therein, four ports, two on each side of said partition, one port on each side communicating with the atmosphere and the other communicating with a main or reservoir, two valves, one on each side of and operated by the partition to control the passage of fluid through the chamber, a thermally-controlled valve applied to each of the ports in communication with the atmosphere, two expansible and contractible chambers, each communicating with one of the ports opening to the atmosphere at a point between the thermal valve thereof and the partition-actuated valve, and two valves, dampers, or like devices, each connected with a movable part of one or the other of said expansible and contractible chambers.

LUCIEN F. EASTON.

Witnesses:
W. E. LOCKERBY,
M. J. LUNDE.